C. W. BARRETT.
AUTOMATIC AIR AND ELASTIC CUSHION TIRE.
APPLICATION FILED FEB. 16, 1914.
1,135,425.
Patented Apr. 13, 1915.
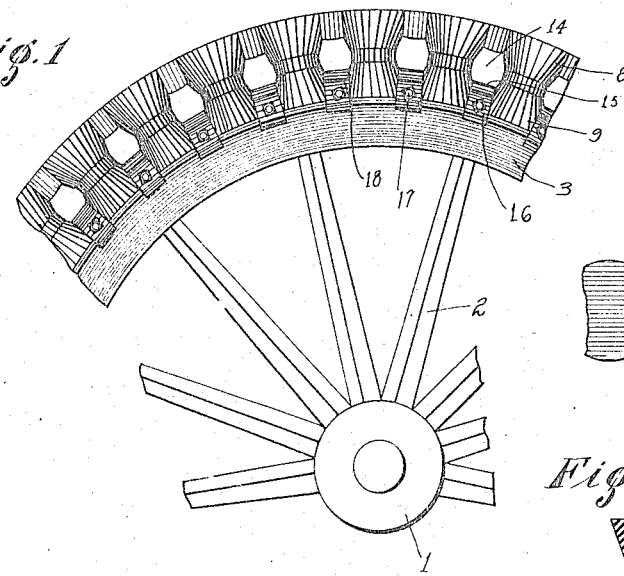
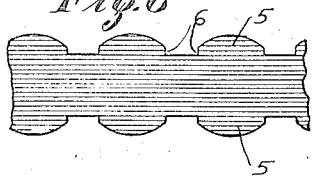
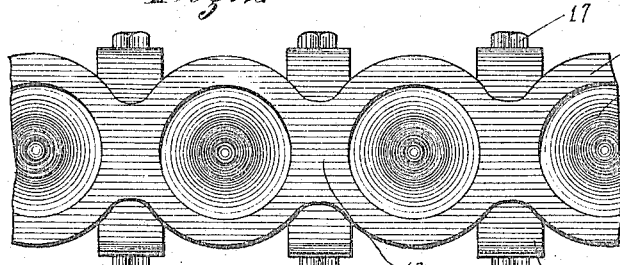
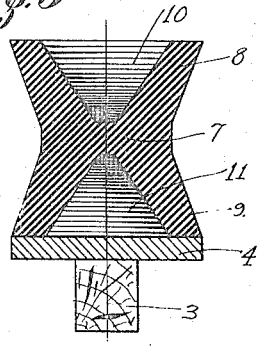
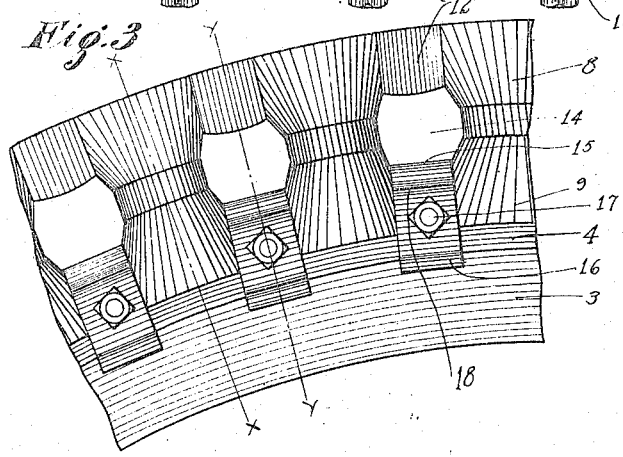
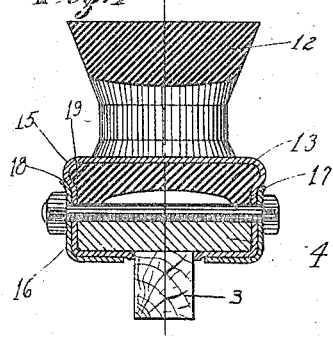
WITNESSES:
J. B. Webster
F. M. Blanchard
INVENTOR.
C. W. Barrett
BY
Perry S. Webster
ATTORNEY

UNITED STATES PATENT OFFICE.

CHARLES W. BARRETT, OF SAN JOSE, CALIFORNIA.

AUTOMATIC AIR AND ELASTIC CUSHION TIRE.

1,135,425.   Specification of Letters Patent.   Patented Apr. 13, 1915.

Application filed February 16, 1914. Serial No. 818,884.

*To all whom it may concern:*

Be it known that I, CHARLES W. BARRETT, a citizen of the United States, residing at San Jose, in the county of Santa Clara and State of California, have invented certain new and useful Improvements in Automatic Air and Elastic Cushion Tires; and I do declare the following to be a clear, full, and exact description of the same, reference being had to the accompanying drawings, and to the characters of reference marked thereon, which form a part of this application.

This invention relates to improvements in vehicle tires and is particularly designed as an air and elastic cushion tire adapted to supplant the pneumatic tires now commonly used.

The invention is further designed to produce such a tire as will have greater cushion, compression, traction and non-skid qualities than the pneumatic tire, the degrees of efficiency in this respect and the reasons therefor being set forth in full hereinafter.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of a fragmentary portion of a wheel and my improved tire thereon. Fig. 2 is a top plan view of a fragmentary portion of my improved tire. Fig. 3 is a side elevation of the same. Fig. 4 is a sectional view taken on a line Y—Y of Fig. 3. Fig. 5 is a sectional view taken on a line X—X of Fig. 3. Fig. 6 is a top plan view of a fragmentary portion of the rim to which my improved tire is secured.

Referring now more particularly to the characters of reference on the drawings, the numeral 1 designates the hub, 2 the spokes and the numeral 3 the felly of the wheel.

In providing my improved invention I first secure to the felly 3, in any suitable manner, a rim 4, which rim is provided with a plurality of curved seats, 5, between which seats are cut in recesses 6 all for a purpose as will presently appear.

My improved tire comprises a continuous member of rubber or similar elastic material made up of primary members consisting of central solid body portions 7 having conical projecting portions 8 on one side and inverted conical projecting portions 9 on the other side. Such portions 8 are provided with central conical cup-like recesses 10 and the portions 9 are provided with similar inverted cone shaped cup-like recesses 11, the body portions 7 forming the bottoms of such recesses 10 and 11. The portions 8 are connected by integral bridges 12 and the portions 9 are connected by integral bridges 13, the bridges 12 and 13 being spaced apart to form intermediate openings 14 for the purpose as will presently appear.

In securing my improved tire to the rim of the wheel, the members 9 are seated on the seats 5 and the entire tire is then securely secured or clamped to the rim by means of the following structure, namely: Leather straps 15 are placed through the openings 14 and around the bridges 13 and around and under the rim 5. Angular clamps 16 are then placed on each side of the rim 4 and set into the recesse 6 and against the straps 15 and are then secured in this position by bolts 17. These bolts 17 project through the clamps 16 and the bridges 13 and lie flat against the top surface of the rim 4. The head of the bolt and the nut on the bolt impinge against the clamps 16 to hold them together and also overlap the top plane of the rim 2 to hold the clamps against the rim thus making a secure fastening for the tire to the rim. The upper ends of the clamps 16 curve outwardly, as at 18, and the outer upper edges of the bridges 13 project in an overlapping manner, as at 19, against the curved ends 18 of the clamps to form cushions to prevent undue wear or friction with the elastic movement of the tire. Also the structure described allows of the leather 15 being drawn closely around the bridges 13 when the bolts 17 are tightened into position.

As will be noted, the entire tire when constructed is a single integral piece made up of the several elements described and securely strapped and clamped to the rim in the manner set forth.

This tire will be used instead of the pneumatic tire now commonly used on wheels and will have the same functions and qualities as a pneumatic tire together with several more effective qualities in the following particulars and for the following reasons, namely: Quadruple cushion, which quadruple cushion effect is accomplished by reason of the following structure, namely: 1st, the natural elasticity and cushion effect of the rubber or other material of which the tire is composed; 2nd, the air cushioning effect of compressing the air into the conical recesses 10 with the compression of the tire; 3rd, the similar compressing of the air in the conical recesses 11 with the compression of the tire; 4th, the overlapping flexible edges above and below the body 7 occasioned by the conical shape of the members 8 and 9 which allow them to be compressed and expanded much more easily than if of a solid construction; non-skid and traction qualities, which non-skid qualities are: 1st, the tendency to vacuum occasioned by the compression of the air in the recesses 10; 2nd, the curvatures and projecting edges of the cones; 3rd, the openings 14 which receive the dirt and mud and form a sort of lock for the same; 4th, the natural clinging tendency of the rubber edges of the cones and bridges.

My improved tire also can be claimed to be very efficiently non-heating due to the air cups or recesses 10 and 11, the intermediate air openings 14 and the general exposed surface due to the construction of the cones and bridges.

As will be noted in Fig. 4, the underside of the bridges 12 are curved from the center outwardly to prevent of the accumulation of any dirt or sand therein.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. A device of the character described comprising the combination with a wheel having a felly, of a tire adapted to be secured to said felly, such tire comprising a single annular member, such member being composed of a plurality of body elements, each body element having a cone shaped member above and below the same, one series of said cone shaped members being adapted to contact with the road, the other series of said cone shaped members being adapted to be seated adjacent said felly, all of said cones being bridged together adjacent their outer ends by means of bridges formed integral therewith, as described.

2. A device of the character described comprising the combination with a wheel having a felly, of a rim thereon, such rim having a plurality of seats, said rim being provided with cut in recesses between said seats, a tire comprising a continuous integral member made up of primary body elements, each of said body elements having a cone projecting above and below the same and all of said cones being bridged together at their outer ends by means of integral members, one set of said cones resting on said seats and clamp members secured over the bridges between said last named cones and secured in said cut in recesses in said rim, as described.

In testimony whereof I affix my signature in presence of two witnesses.

CHARLES W. BARRETT.

Witnesses:
  STEPHEN N. BLEWETT,
  FLOYD M. BLANCHARD.